June 1, 1937. J. MAGIDSON 2,082,349
DOUBLE WINDSHIELD MECHANISM
Filed July 18, 1935 2 Sheets-Sheet 1

INVENTOR
Joseph Magidson
BY
Harry Jacobson
ATTORNEY

June 1, 1937. J. MAGIDSON 2,082,349
DOUBLE WINDSHIELD MECHANISM
Filed July 18, 1935 2 Sheets-Sheet 2
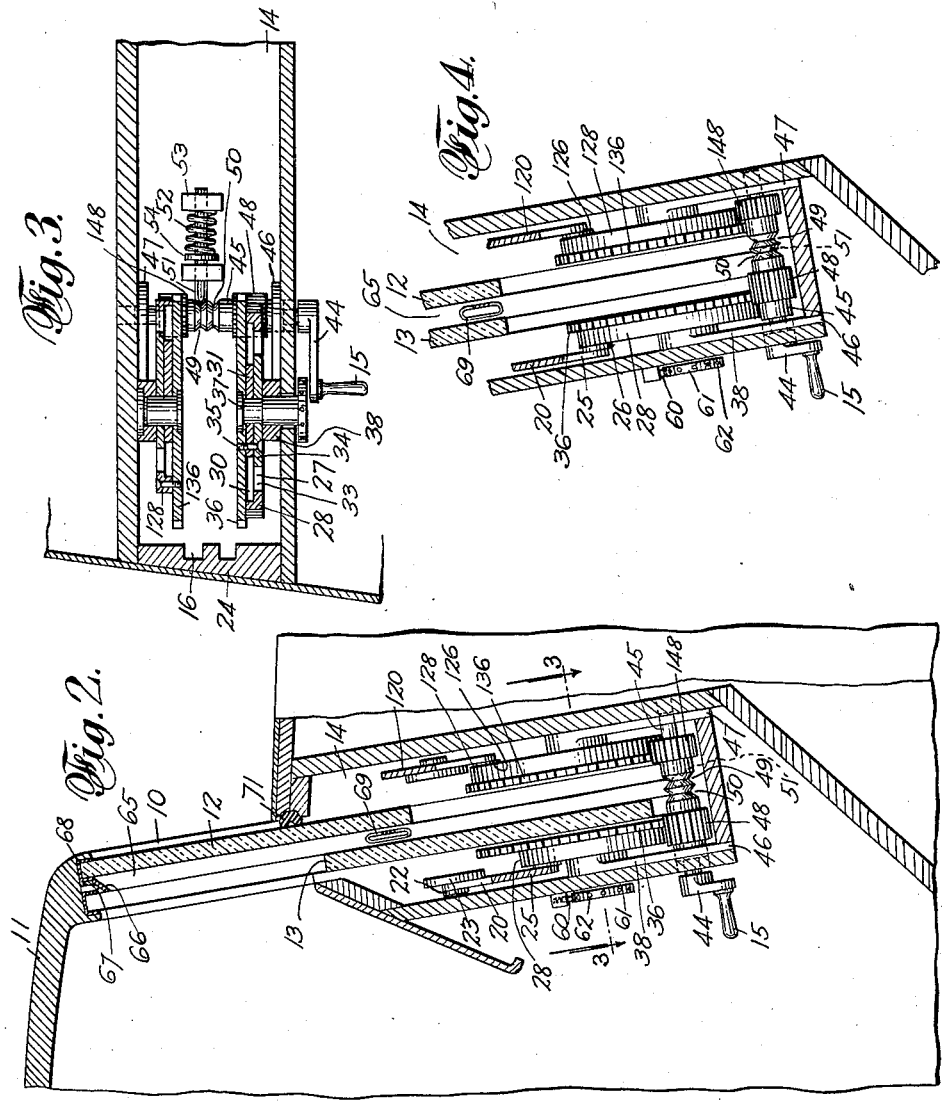
INVENTOR
Joseph Magidson
BY
Harry Jacobson
ATTORNEY Patented June 1, 1937

2,082,349

UNITED STATES PATENT OFFICE 2,082,349

DOUBLE WINDSHIELD MECHANISM

Joseph Magidson, New York, N. Y.

Application July 18, 1935, Serial No. 32,046

14 Claims. (Cl. 296—84)

This invention relates to double wind shields and particularly, to those employed in automobiles or other vehicles.

My invention contemplates the provision of simple and efficient mechanism for moving both glass members of a double wind shield into position to provide ventilation through the wind shield opening when desired, and for moving one of said members entirely independently of the other, regardless of the direction of movement of the other member and regardless of the relative position of the other member of the double wind shield, whereby said members may be arranged in any desired position in the path of movement thereof in the wind shield opening.

My invention further contemplates the provision of mechanism comprising parts adapted to be preset relatively to each other for moving the wind shield members.

My invention further contemplates the provision of duplicate presettable mechanism operated by a single handle for moving the wind shield members to the selected positions thereof.

The various objects of my invention will be clear from the description which follows, and from the drawings, in which Fig. 1 is a vertical section of a double wind shield and of the compartment into which the wind shield moves showing my new wind shield operating mechanism.

Fig. 2 is a vertical section of the same.

Fig. 3 is a horizontal section, taken on the line 3—3 of Fig. 2.

Fig. 4 is a fragmentary vertical section similar to Fig. 2, showing the closed position of the glass members of the wind shield, and showing the pinion for operating the outer member in its inoperative position.

Figure 1:
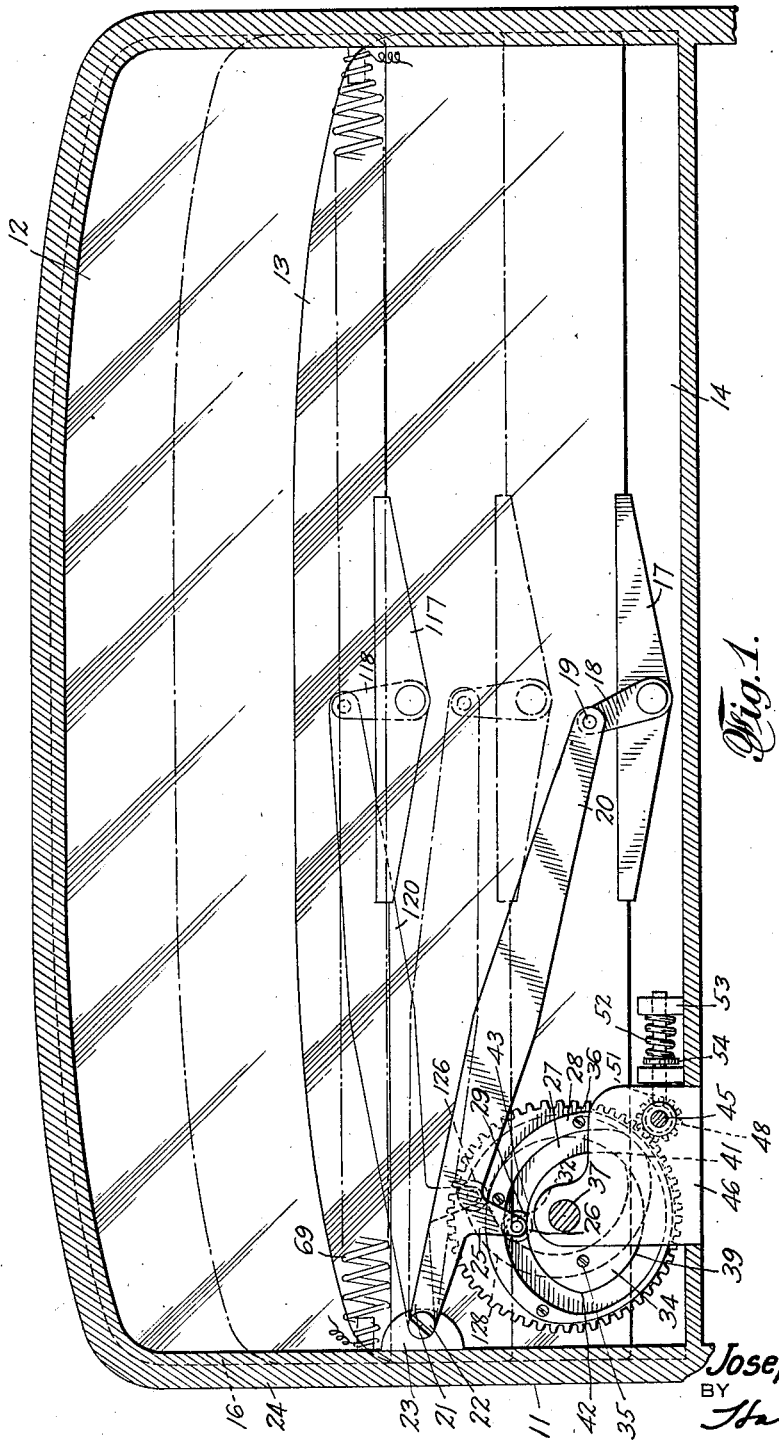

In the practical embodiment of my invention which I have illustrated by way of example, the wind shield opening 10, of the vehicle such as the automobile 11, may be closed by the preferably spaced glass members 12 and 13, adapted to move in a generally vertical or inclined direction into and out of the opening 10. The mechanism for so moving the members 12 and 13 is preferably arranged below the opening 10 in a suitable compartment 14 in the body of the vehicle adapted also to receive said members, said mechanism being controlled by a single handle 15 accessible to the operator. The compartment 14, however, may be arranged if desired, above the wind shield opening in a manner which is obvious and hence needs no illustration.

The mechanism is so designed as to move either of the members 12 and 13 or both. Duplicate parts are therefore provided therein, adapted to be so set relatively to each other that the movement of said members occurs simultaneously or alternately or in the same direction or in opposite directions depending on the relative setting of the duplicate parts, each member being movable by the mechanism regardless of the position of the other member relatively to the wind shield opening.

The duplicate mechanisms for operating each of the members 12 and 13 are connectable for simultaneous operation and disconnectable for operation of only one of the members which, as illustrated, is the member 13. Each of the members 12 and 13 is guided in suitable grooves 16 in its movement in the frame 24 of the wind shield opening 10. One of the duplicate mechanisms will now be described.

At its lower edge, the member 13 carries the movable glass-holding frame 17 to the center of which is pivoted the link 18. Pivoted to said link as at 19 is one end of the lever 20, the other end 21 of said lever being pivoted on the fixed pivot 22 as by means of the bracket 23 secured to the wind shield frame 24.

Projecting from the lever 20 intermediate its ends is the arm 25 carrying the cam roller 26. Said cam roller is permanently arranged in the cam groove 27 of the cam 28. The cam roller consists of a larger disc portion 29 inserted in the larger groove 30 of the inner cam plate 31, said cam roller disc 29 being constricted into or carrying a smaller roller disc 32 operating in the smaller groove 33 formed by the outer cam plate part 34. The cam plates 31 and 34 are suitably secured together as by means of the screws 35 to hold the larger cam roller part 29 against lateral displacement from the cam groove, said roller being thereby maintained in the cam groove at all times. Secured to the cam 28 by the screws 35 is the spur gear 36, mounted for rotation together with the cam as a unit on the shaft 37. Said shaft is suitably supported as by means of the standard 38.

It will be noted that the cam groove 27 is provided with a circular or "dwell" portion 39 extending around one third of the circumference, i. e., about 120°, from the point 41 (Fig. 1) to the point 42 so that when the roller 26 is on the portion 39, no movement of the lever 20 can occur, the roller being maintained at a constant distance at that time from the center of the shaft 37. The lowest point 43 of the cam is midway between the points 41 and 42 whereby movement of the roller from the points 43 to 41 through an angle of about 120° will swing the lever upwardly to elevate the member 13 into its position for closing the wind shield opening or vice versa, when the roller moves from the point 41 to the point 43. Similarly, the opening or closing movement of the member 13 occurs when the cam roller moves over the cam portion between the points 43 and 42.

It will thus be seen that during a complete rotation of the gear 36, the wind shield member remains stationary through a third of a turn, that is, when the roller is on the cam portion 39, and that the wind shield member 13 may be completely raised or lowered by rotation of the gear 36 through an angle of about 120°.

Rotation of said gear 36 is effected by means of the crank handle 15 and crank 44, the crank being secured to the shaft 45 for rotation therewith. Said shaft is supported for limited longitudinal movement in the walls of the compartment 14 and/or in suitable bearings as 46, 47, said bearing providing stops for limiting the positions of the shaft in its endwise movement in either direction. Secured to the shaft 45 is the pinion 48 meshing with the gear 36 and of considerably greater thickness than that of said gear 36.

To maintain the shaft in either of the positions into which it may be set in its longitudinal movement, a pair of circumferential and generally V-shaped grooves 49, 50 are made in the shaft, the bottoms of said grooves being spaced apart a distance equal to the desired longitudinal movement of the shaft. A rod as 51 having an end shaped to fit the grooves is urged into the groove by means of the spring 52 interposed between the bearing 53 for the rod and the collar 54 of said rod. When the rod end enters one of the grooves, it will be understood that rotation only of the shaft can occur unless and until the shaft is deliberately moved longitudinally.

In the position shown in Fig. 2, the rod 51 enters the groove 49. Should it be desired to move the shaft from that position, that is, toward the wind shield member 12, then the shaft is pushed inwardly, whereupon the rod end is cammed out of the groove 49 and enters the groove 50 under the influence of the spring 52 and holds the shaft in its new position (Fig. 4).

As has been above indicated, the operating mechanism for the wind shield member 12 is substantially identical with that above described for operating the member 13. The description of said mechanism need not therefore be repeated except to say that the frame 117, the link 118, the lever 120, the cam roller 126, the cam 128 and the gear 136 are similar to the corresponding parts 17, 18, 20, 26, 28 and 36. The pinion 148 of the shaft 45, however, is of less thickness than the pinion 48 and is of less effective thickness than the distance between the centers of the grooves 49 and 50. When the shaft 45 is pushed inwardly so that the rod 51 is in the groove 50, the pinion 148 no longer meshes with the gear 136. It will therefore be seen that in the positions of the parts just described, rotation of the shaft 45 rotates the cam 36 only, to operate the wind shield member 13, but does not rotate the gear 136 and therefore causes no movement of the wind shield member 12.

It will further be seen that the pinion 48 being constantly in mesh with the gear 36, the cams 28 and 128 may be set relatively to each other on the disengagement of the pinion 148 from its gear at the desired instant, and thereby to carry the respective cam rollers 28 and 128 to any desired relative positions on their respective cams. When the rollers are on the corresponding points of both cams and when the shaft 45 is in the position indicated in Fig. 2, then the members 12 and 13 are simultaneously operated in an identical manner. That is, they will start their movements from the same point and move in the same direction the same distance. In other words, the members 12 and 13 will move in unison.

Such movement, however, may be interrupted at any instant by pushing the shaft 45 inwardly to disengage the pinion 148 from its gear, in which case the member 13 is operated entirely independently of the member 12 and regardless of the position of said member 12, which remains in the position in which it has been set during the entire time that the pinion 148 is inoperative.

During one complete rotation of either of the gears 36 or 136, the wind shield member operated by the gear remains stationary through a third of the revolution of the gear, it drops from uppermost position to lowermost position during another third of the revolution and rises from lowermost to uppermost position during the remaining third of the revolution. It will therefore be seen that if the roller 26 remains on the portion 39 of its cam, the member 13 is in its highest position wherein it closes the wind shield opening and remains in that position while the member 12 may be moved from its uppermost to its lowermost position or vice versa at the time that the member 13 does not move at all. That is, the roller 28 during the third of the revolution of the cam 28 rests on the portion 39 of said cam 28 and therefore does not move the member 13 but the roller 126 may be so set as to operate between the highest and the lowest points of the cam and thereby to completely raise or lower the member 12 while the member 13 is at rest.

Similarly, if the cams 28 and 128 are so set that the cam roller 126 remains on the dwell, corresponding to the dwell 39, of the cam 128 while the roller 26 operates between the points 42 and 41 or 43 and 41, then the member 12 is stationary while the member 13 is raised or lowered by the rotation of the crank 44 through the handle 15 in the proper direction.

It will be understood that the crank 44 may be rotated in either direction and that the direction of movement of the wind shield members 12 and 13 can be determined, regardless of the relative settings of the rollers on their respective cams, by observation or turning the crank 44 through a small angle. If the direction of movement is not that desired, the rotation of the crank can be reversed by the operator.

It will also be understood that by disconnecting the pinion 148 from its gear, the gear 36 may be rotated to bring both wind shields to the same position and to bring both rollers on the same corresponding points of their respective cams, whereafter if the pinion 148 is reconnected to its gear, rotation of the crank 44 will cause both wind shield members to move in unison. It thereby becomes possible to partly lower both of the members 12 and 13 to provide a ventilating space above the wind shield members of as large or as small a size as may be found desirable. In view of the great number of possible relative settings of the cams 28 and 128, it will be understood that any desired relative positions of the wind shield members 12 and 13 may readily be attained and that the above description of some of the various settings is sufficient for complete understanding of the operation of the mechanism.

In order to avoid unnecessary displacement of the relative setting of the cams, I have provided a spring-pressed detent 60 carried by the inner wall of the compartment 14 and comprising a pin having a rounded end and pressed by a spring inwardly and radially of the stop disc 61. Said disc is provided with a series of circumferentially spaced holes 62, which may be marked by any suitable indicia as numerals or words of instruction to apprise the operator of the correct position of the crank and its shaft to effect a predetermined setting of the wind shield members 12 and 13 in a manner which will now be obvious and need not be described in detail.

Referring now particularly to Fig. 2, the space 65 between the members 12 and 13 is preferably sealed when both members are in their uppermost positions, by means of the flexible, preferably rubber member 66 carried by the bracket 67 on the cap 68 and preferably extending along the entire length of the member 12. Said member 66 serves also as a wiper to clean the outer surface of the member 13 on the relative movement of said members 12 and 13 past each other. It is advisable to heat the space 65 to prevent the accumulation of frost, snow or sleet on the wind shield members in a manner which is well understood. The heater 69 is therefore arranged in the compartment 14 in such position as to heat the air in the space 65. Said heater 69 may be of any type, that is, while illustrated as an electric heater, it may obtain its heat from the exhaust of the automobile engine, or from the water-cooling system of the automobile.

A rubber or the like sealing member 71 may also be arranged at the top wall of the compartment 14 to contact with the outer surface of the wind shield member 12 and thereby to clean said surface during the movement of the member 12, said member 71 serving the additional purpose of preventing the entrance of rain water into said compartment.

It will be seen that I have provided a double wind shield mechanism whereby the wind shield members may be moved independently or in unison in either direction and whereby either of the wind shield members may be positioned at any desired points in the entire path of the movement thereof with the advantages flowing therefrom of possibility of ventilation, exchange of wind shields and the prevention of accumulation of mist, snow, ice and sleet on the wind shield members and the cleansing of the wind shield members, during their movements, and that I have provided a double wind shield well designed to meet the severe requirements of practical use.

While I have shown and described a specific embodiment of my invention, I do not intend to limit myself to the specific form shown and described, but intend to claim my invention as broadly as may be permitted by the state of the prior art and the terms of the appended claims.

I claim:

1. In a double wind shield or the like transparent closure, a pair of similar closure members, a single handle for controlling the movement of said members, and means operatively connecting the handle to said members for moving either of said members independently of the other, for also moving said members in unison, and for also setting either and both of said members at any point in the path of the movement thereof, including a pair of similar cams, and also including means disconnectable from one of said cams for rotating said cams.

2. In a double wind shield or the like transparent closure, a pair of closure members, and means for operating said members including a pair of similar cams, each having a cam surface of predetermined shape, and a pair of pivoted levers each operated by the cam surface of one of the cams, and means for rotating said cams, said rotating means being movable into a position wherein one of said cams is not rotatable by said rotating means.

3. In a double wind shield or the like transparent closure, a pair of parallel closure members, one spaced laterally from and behind the other to provide a narrow space therebetween substantially coextensive with said members, means carried by one of said members for closing the upper end of said space in certain relative positions of said members, and means for selectively moving either and both of said members to arrange said members in any selected position in the path of movement thereof, said means including a pair of similar rotatable members, means for operatively connecting said rotatable members to the closure members, each of said rotatable members having an operating portion thereof inoperative to effect movement of the aforesaid connecting means, and manually operable means for changing the relative positions of said rotatable members.

4. In a mechanism of the character described, a pair of similar revoluble cams mounted for continuous rotation in either direction through any angle, a pair of coaxially mounted pinions for rotating the cams, a pair of gears engaging the respective pinions and mounted coaxially of the respective cams, one of said pinions being of greater thickness than the other, and a longitudinally movable shaft carrying said pinions whereby said pinions may be operatively connected to the respective cams and the thinner pinion may be rendered inoperative with respect to its cam while the other pinion remains operative relatively to the other cam.

5. In a double wind shield or the like closure, a pair of similar spaced closure members, a pair of levers each operatively connected to one of said members, a pivot for each of said levers and means for swinging said levers simultaneously and for also swinging said levers independently of each other, said means comprising elements continually revoluble in either direction and pivoted on an axis in spaced relation to the pivots of said levers and rotatable mechanism for rotating said elements relatively to each other to set said levers in selected angular relation.

6. In a wind-shield operating mechanism for a pair of spaced movable wind shields arranged in face to face relation, a space-sealing member carried by and movable with one of said wind shields and slidably engaging the adjacent face of the other wind shield, a pair of similar revoluble operating members, means for operatively connecting the operating members to the wind shields, and means for rotating said members simultaneously and for also rotating one of said members independently of the other, including a longitudinally movable shaft, and means on the shaft operatively connected at all times with one of said members and operatively connectable to and disconnectable from the other.

7. In mechanism of the character described, a pair of spaced transparent members, a pair of operating levers each connected to the lower edge of one of said members, a cam for each of the levers, a gear for each cam, a pinion for each of the gears, one of the pinions being thicker than the other, a longitudinally movable shaft carrying said pinions, and means for retaining the shaft in either of a pair of predetermined limiting positions to selectively arrange said pinions in engagement with their respective gears and to disengage the thinner pinion from its gear, and an operating handle for said shaft.

8. In a double wind shield or the like transparent closure, a pair of spaced movable closure members, a compartment for the reception of said members, a pair of pivoted levers, each connected to one of said members arranged in the compartment, a pair of revoluble presettable cams arranged in the compartment and engaging the levers for setting said levers in selected angular relation, for moving either of said levers simultaneously and for also moving said levers in unison and in the same direction, an operating handle outside of the compartment, and an operative connection between and adapted to connect and disconnect one of said cams and said handle.

9. In a double wind shield or the like closure, a pair of closure members arranged with a space therebetween, an operating mechanism for one of said members including a cam having a cam surface and a pivoted member mounted on a different axis from that of the cam and operated by the cam surface, a similar mechanism for the other wind shield member including a similar cam having a similar cam surface and a similar pivoted member, and means operatively connectable to and disconnectable from one of said mechanisms for operating both of said mechanisms including a single operating handle.

10. In a double windshield or the like closure, a pair of similar movable closure members, mechanism for operating both of said members simultaneously including a pair of independently rotatable similar cams, gear means including a pair of pinions and a pair of gears engageable with the pinions and each secured to one of the cams, said gear means being settable to operate said cams independently to move either and both of said members to any desired point in the path of the movement thereof, and a single operating handle for said gear means.

11. In mechanism of the character described, a movable transparent member, an operating lever connected to the lower edge of said member, a cam for the lever, said cam having a cam surface of predetermined shape, a gear secured to the cam, a pivot for the lever arranged in spaced relation to the axes of the gear and cam, a pinion engaging said gear, a shaft carrying said pinion, and an operating handle on the shaft whereby rotation of the handle causes rotation of the cam and therethrough operates the operating lever to raise and lower said member.

12. In mechanism of the character described, a movable transparent member, a lever connected at one end to an edge of said member, a cam for moving the other end of said lever, said cam being provided with a dwell portion causing no movement of said other end of the lever, said cam being also provided with another portion causing movement of said other end of the lever in a direction to lower said member, and the remaining portion of said cam being shaped to cause movement of said other end of the lever in a direction to raise said member, and means for rotating said cam.

13. In a mechanism for moving a closure member, a lever operatively connected to said closure member and a rotatable cam for operating the lever, part of said cam being inoperative to cause movement of the lever, another part of said cam being shaped to cause movement of the lever in a direction to raise said closure member, and the remainder of the cam being shaped to cause movement of the lever in a direction to lower said closure member, whereby said cam may be rotated into position wherein a predetermined rotary movement thereof causes no movement of the closure member.

14. In mechanism of the character described, an operating lever, a cam for said lever, said cam being provided with symmetrical portions shaped to cause predetermined movement of the lever in opposite directions, a gear secured to the cam, and means for rotating the gear.

JOSEPH MAGIDSON.